J. R. DICKSON.
Bee-Hive.

No. 159,650. Patented Feb. 9, 1875.

Witnesses
Robt Everitt
Geo. E. Whaul

Inventor
Jos. R. Dickson,
Chipman Hosmer & Co.
Attorneys

UNITED STATES PATENT OFFICE.

JOSEPH R. DICKSON, OF TUPELO, MISSISSIPPI.

IMPROVEMENT IN BEE-HIVES.

Specification forming part of Letters Patent No. 159,650, dated February 9, 1875; application filed November 14, 1874.

*To all whom it may concern:*

Be it known that I, J. R. DICKSON, of Tupelo, in the county of Lee and State of Mississippi, have invented a new and valuable Improvement in Bee-Hives; and I do hereby declare that the following is a full, clear, and exact description of the construction and operation of the same, reference being had to the annexed drawings making a part of this specification, and to the letters and figures of reference marked thereon.

Figure 1:
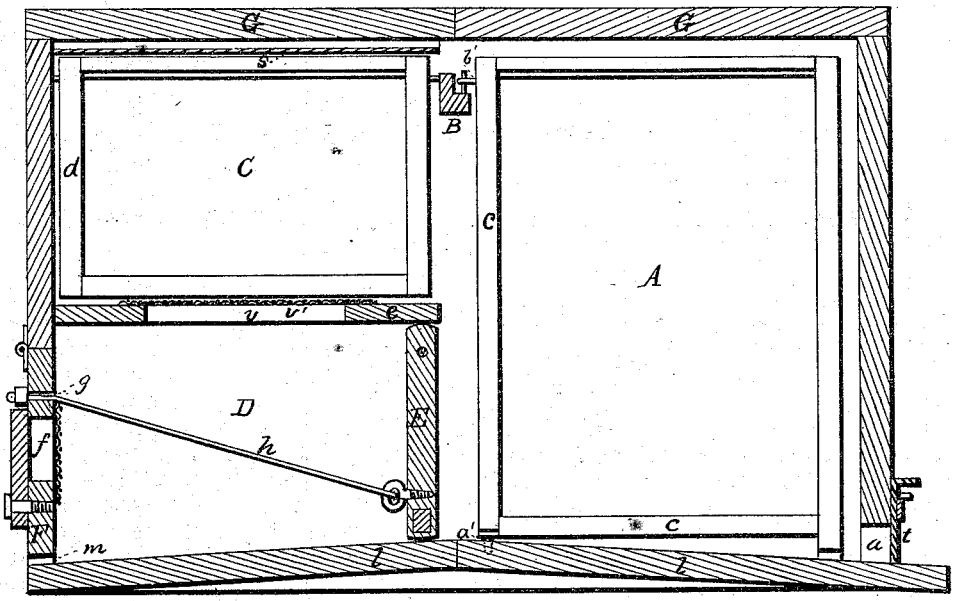
Figure 2:
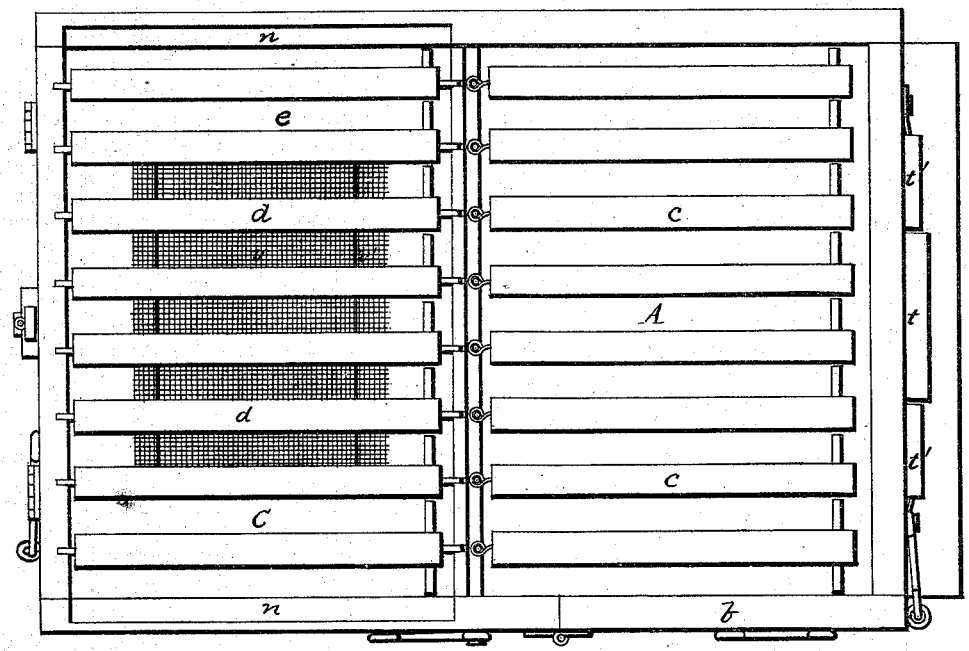

Figure 1 of the drawing is a representation of a longitudinal vertical section of my bee-hive, and Fig. 2 is a plan view of the same.

This invention has relation to bee-hives; and it consists in the construction and novel arrangement of the brood-chamber, the honey-box, and the secluding-chamber or trap under the latter; in the gauze partition between the honey-box and the trap; in the arrangement of the inner and outer doors of the trap and the operating-cord; and in the arrangement of the partition-beam and doors of the hive-case, all as hereinafter more fully set forth.

The hive-case is horizontal in position and longer than wide.

In the accompanying drawings, the letter A designates the brood-chamber, occupying the entire depth of the case at one end. The bee-entrance $a$ is in this end of the hive-case, and in the side wall of said case a door, $b$, is provided, having its hinged edge toward the middle of the wall, so that when swung open it will vibrate in the same way that the comb-frames $c$ swing, the latter being pivoted by vertical pins $a'$ in the floor of this chamber, and by staples $b'$ to studs in the transverse beam B, which is located across the central portion of the hive at its top, and divides the brood-chamber from the honey-chamber. This door is designed to facilitate the operation of taking out these swinging comb-frames, when this is necessary for their examination, and in looking for moth. C represents the honey-box, which is not constructed of the full depth of the hive. This honey-chamber is provided with frames $d$, which are suspended by horizontal pins, which rest in notch-bearings made in the upper edge of the end wall of the hive-case, and in the transverse beam B. Under this honey-box, and separated therefrom by a horizontal partition, $e$, is the secluding-chamber or trap D, which extends to the floor $l$ of the hive, which is made shelving each way from the middle line, as shown in Fig. 1 of the drawings. In the partition $e$ is a large rectangular opening, $v$, which is covered with wire-cloth $v'$, and allows the cuttings to fall through. Between the trap or secluding-chamber and the brood-chamber A is a large opening, which is provided with a swinging door, E, which is hung by means of two wire pivots at its upper corners. The external door, F, of this chamber is hung in a similar manner, and is provided with a light-opening, $f$, and cover, and an aperture, $g$, through which passes a cord, $h$, which is attached to the lower portion of the inside door of the secluding-chamber, and serves to enable the apiarist to raise this door from the rear, so that the bees can be readily driven into it when it is necessary to examine any of the brood-frames. When the bees are driven into the chamber D the inner door, E, is dropped, and they are cut off from the brood-chamber completely. The opening $f$ is designed to be kept closed, except when it is desired to drive the bees into this chamber. It is then opened and the bees will move toward it very rapidly when the swinging door is raised. The external door, F, is designed to facilitate the operation of cleaning out under the honey-box. Under this door is a small slot, $m$, which will admit the miller into the secluding-chamber, which thus becomes an admirable moth-trap, and answers a twofold purpose.

The cover of the hive-case is made in two portions, which are, respectively, hinged to the upper edge of the wall of said case, and have their line of separation immediately over the transverse beam B. Either section, G, of the cover can be opened separately, and, therefore, the brood-chamber and honey-box can be looked into without disturbing the bees.

In the inner side of the upper edges of the walls of the hive, along the honey-box, ledges $n$ are cut for the reception of the ends of a glass plate, $s$, through which it can be ascertained when the honey is ready to be removed. When this is the case the bees are to be driven into the brood-chamber, and the honey can be taken without injury either to the bees or to the bee-keeper.

On each side of the entrance-gate $t$ are supplementary gates, $t'$, which are not designed to be raised, except for the removal of the cuttings from the brood-chamber.

What I claim as new, and desire to secure by Letters Patent, is—

1. The horizontal hive herein described, having in one end the brood-chamber A and its frames, and in the other end the honey-box C and secluding-chamber D, arranged the one over the other, and divided by an open partition covered with wire-cloth, substantially as specified.

2. The secluding-chamber D, herein described, arranged under the honey-box, and at the side of the brood-chamber, and provided with the horizontally-hinged inner and outer doors E F, the latter having a light-opening and a perforation for the operating-cord attached to the former, substantially as specified.

3. The combination, with the horizontal hive, having the brood-chamber and the honey-box arranged side by side, of the transverse partition-beam B, supporting the inner ends of the frames of each chamber, and the sectional covers G, divided above said beam, as specified.

In testimony that I claim the above I have hereunto subscribed my name in the presence of two witnesses.

JOSEPH RANEY DICKSON.

Witnesses:
    FRED. F. NORTON,
    L. L. LEDBETTER.